Patented Feb. 18, 1941

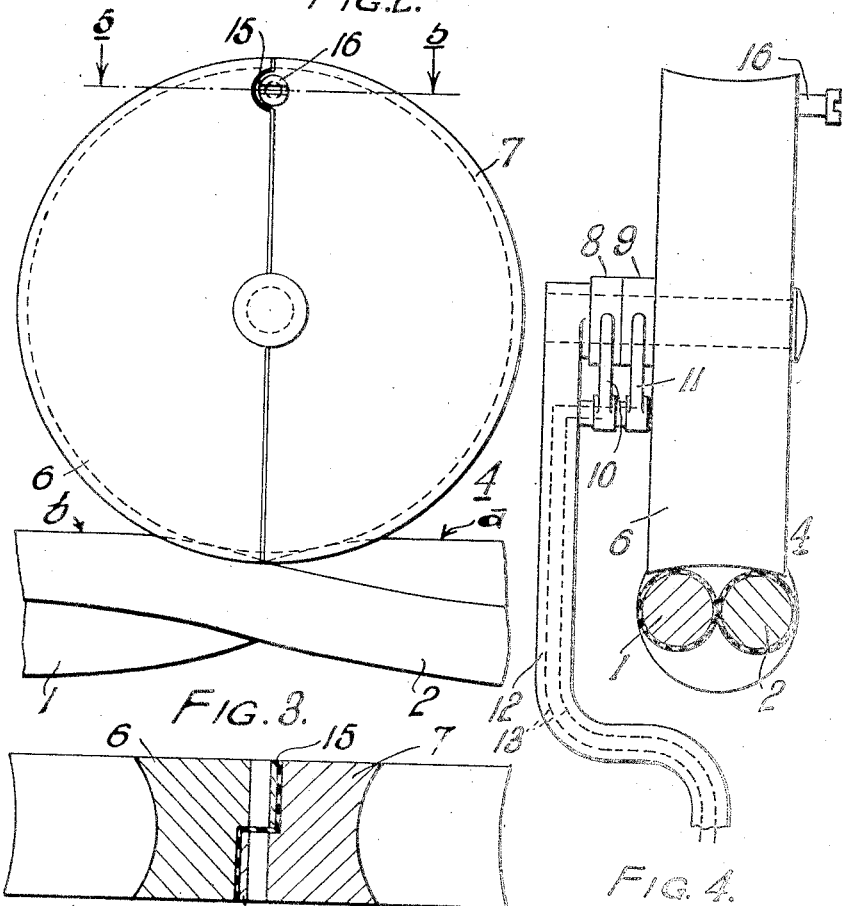

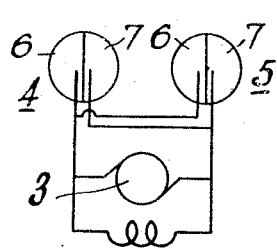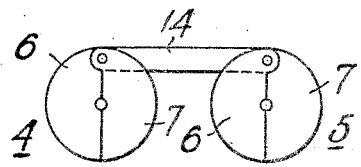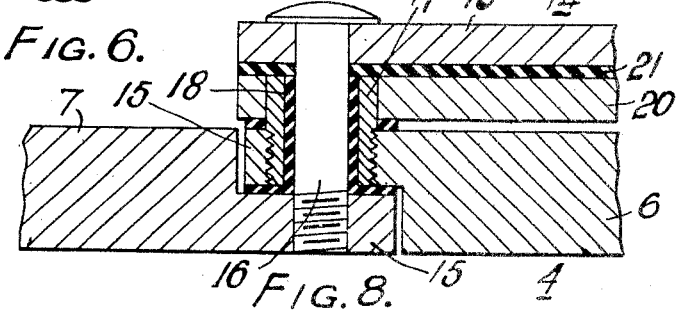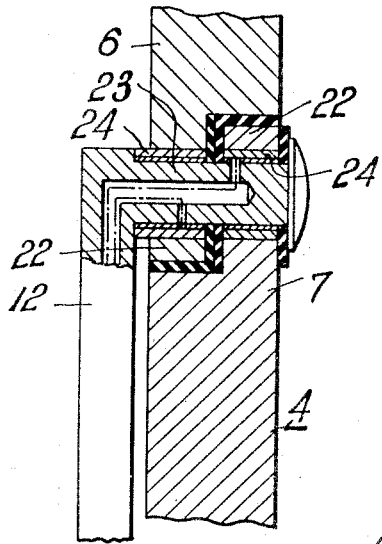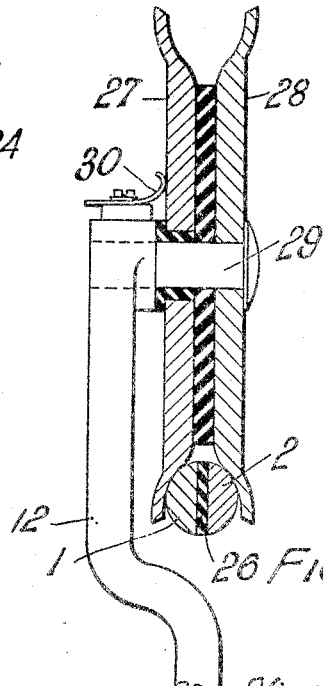

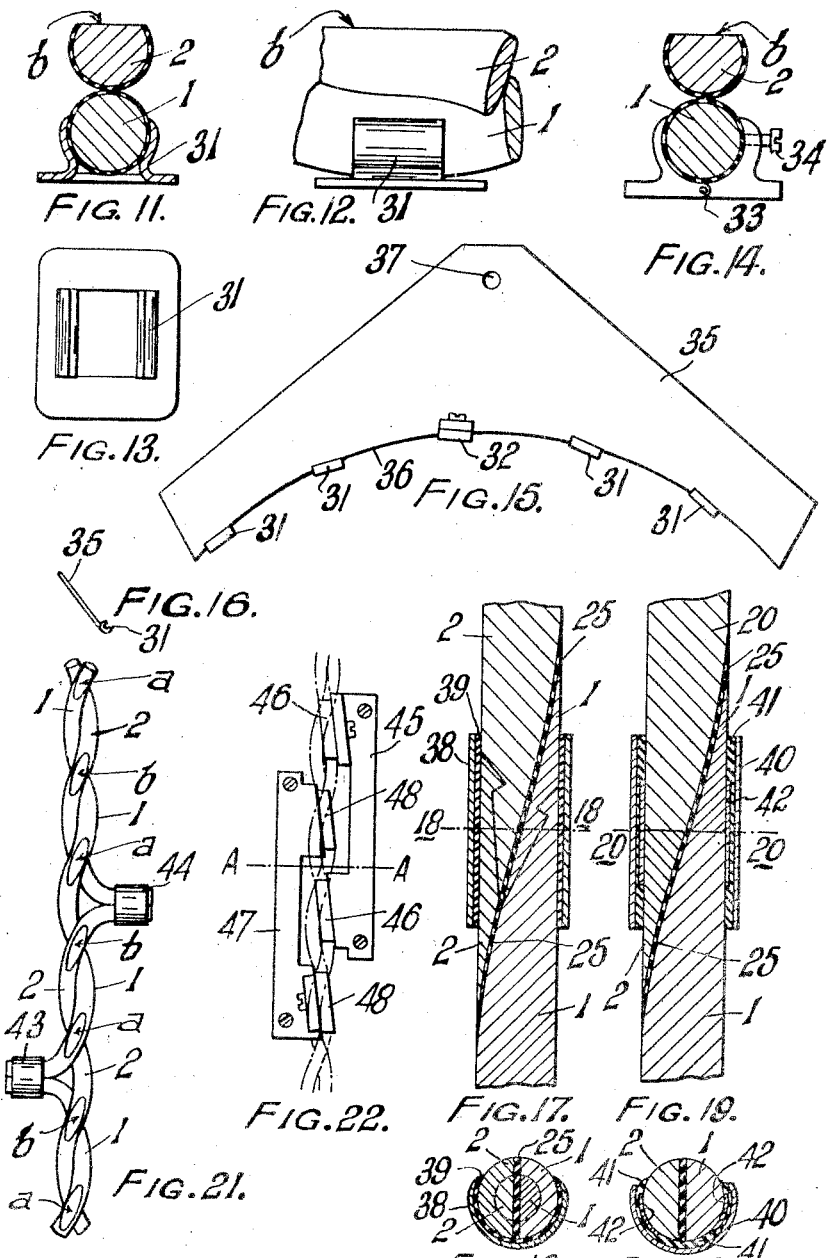

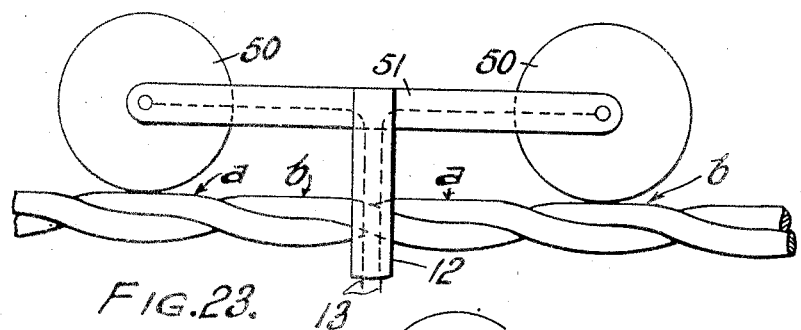
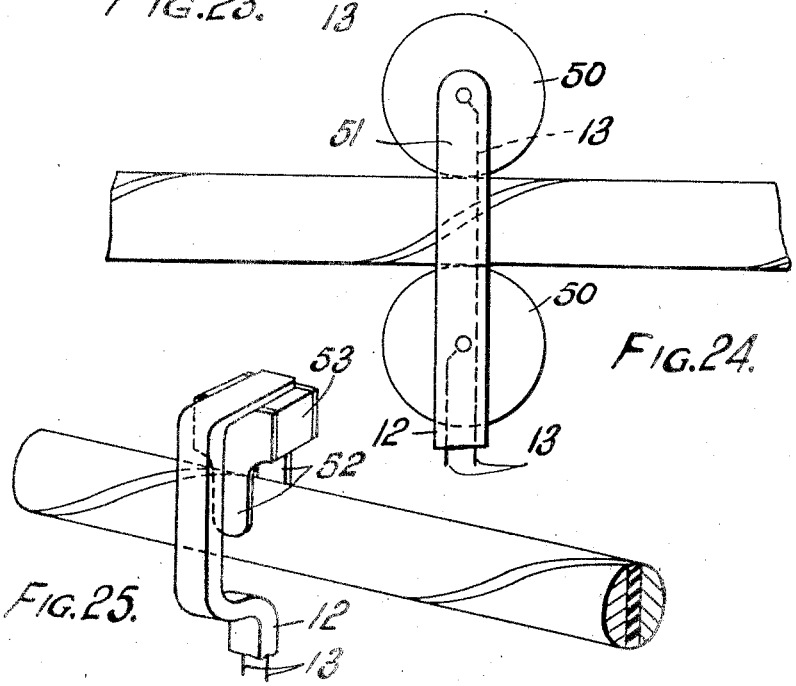
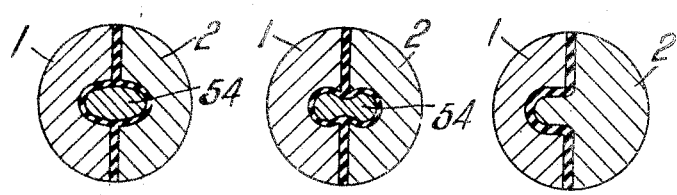

2,232,222

UNITED STATES PATENT OFFICE 2,232,222

SUPPLY CABLE FOR VEHICLES AND COLLECTORS THEREFOR

Hugo Victor Flinn, Rushbrooke, Cobh, Irish Free State

Application December 28, 1937, Serial No. 182,044
In Great Britain January 1, 1937

11 Claims. (Cl. 191—12)

This invention relates to supply cables for vehicles and collectors therefor.

The object of the invention is the provision of improvements in such cables and collectors and the invention consists broadly in the arrangement that a number of conductors are combined to form a single cable and the conductors of said cable are connected to the energising circuit in the vehicle by means of a collector which runs on said cable and connects the appropriate conductors to the terminals of said circuit.

In order that the invention may be the more clearly understood, certain arrangements in accordance therewith will now be described, reference being made to the accompanying drawings, wherein—

Figure 1 is a side elevation of a cable in accordance with the invention.

Figure 2 is a similar view of another and somewhat different form of cable in accordance with the invention.

Figure 3 is a side elevation of a collector pulley wheel adapted to run on the cable shown in Firgure 1 or 2.

Figure 4 is an end elevation of the same illustrating the way in which current is led from said pulley wheel to the vehicle motor.

Figure 5 is a sectional plan of the same on line 5—5 of Figure 3, some of the detail being omitted.

Figure 6 is a diagram of connections illustrating the way in which a collector comprising two pulley wheels, such as that of Figures 3 to 5, is connected in circuit with the electric driving motor of the vehicle.

Figure 7 is a side elevation of such a collector showing the connecting rod for coupling the two pulleys together.

Figure 8 is an enlarged section similar to the sectional portion of Figure 5 illustrating the manner in which the connecting rod establishes certain electrical connections.

Figure 9 is an enlarged section of the central portion of one of the pulley wheels illustrating an alternative way in which current is led from said pulley wheel to the vehicle motor.

Figure 10 is a cross section of a pulley wheel of a modified form of collector adapted for use with a different form of cable.

Figure 11 is a cross section of a cable such as that of Figure 1 together with a suitable bracket for supporting the same.

Figure 12 is a side elevation of the parts shown in Figure 11.

Figure 13 is a plan of the bracket of Figures 11 and 12.

Figure 14 is a similar view to Figure 11 showing a slightly different form of bracket.

Figure 15 is a plan of a device for supporting a cable at a bend.

Figure 16 is an end view of the same.

Figure 17 is a longitudinal section illustrating a method of joining two lengths of cable in accordance with Figure 2.

Figure 18 is a cross section of the parts shown in Figure 17 on line 18—18 of Figure 17.

Figure 19 is a similar view to Figure 17 illustrating an alternative method of joining two lengths of cable in accordance with Figure 2.

Figure 20 is a cross section of the parts shown in Figure 19 taken on line 20—20 of Figure 19.

Figure 21 illustrates a method of joining two lengths of cable in accordance with Figure 1.

Figure 22 illustrates an alternative device for joining two lengths of cable in accordance with Figure 1.

Figure 23 is an alternative form of collector for use with the cable of Figure 1 or 2 when duo directional current is required.

Figure 24 is a variant of Figure 23 for use with the cable of Figure 2.

Figure 25 is a variant of Figure 24.

Figure 26 is a cross section of a variant of the cable illustrated in Figure 2 or 10.

Figure 27 is a similar view to Figure 26 of a slightly modified cable.

Figure 28 is a cross section of a further variant of the cable illustrated in Figure 2 or 10.

Referring to the drawings I provide two wires 1 and 2 (Figure 1) insulated say by means of a suitable enamel, and I twist said wires together at a uniform pitch and then plane down the cable so formed at one side in such a way that the insulation is removed at intervals there along and alternate conductive areas a and b, which belong to the two wires 1 and 2 respectively are exposed. When the two wires 1 and 2 are connected to the terminals of a source of supply it is clear that the conductor areas a and b will be respectively of positive and negative polarity, and the cable is adapted to be used for supplying the motor 3 (Figure 6) of a vehicle through the medium of a collector unit comprising two pulley wheels 4 and 5 (Figures 3 to 9) which roll along said cable and each comprise mutually insulated portions 6 and 7 spaced so that each portion is adapted always to engage areas a or b of the same polarity and connected by slip ring means to the appropriate terminals of the motor 3.

Thus each pulley wheel 4 or 5 of the collector unit consists of two mutually insulated semi-circular halves 6 and 7, and the circumference of the pulley wheel is equal to twice the distance between adjacent conductive areas a, b of the cable so that each half will always engage a conductive area of the same polarity. The two pulley wheels 4 and 5 moreover are spaced apart a distance equal to an odd multiple of the distance between adjacent conductive areas a, b, so that while the positive half say 6, of one pulley wheel say 4 is live the negative half say 7 of the other is live. Thus the two positive halves 6 being permanently connected by slip rings to the positive terminal of the motor 3 and the two negative halves 7 to the negative terminal of said motor, the latter will be energised unidirectionally and substantially continuously.

The slip rings may consist of two small mutually insulated rings 8 and 9 (Figure 4) mounted side by side concentrically with, and in rigid relation to, the pulley wheel and connected respectively to the two halves 6 and 7, and current may be taken from these rings by respective brushes 10 and 11 engaging with their peripheries and mounted on an insulating collector arm 12 extending to the vehicle from the axle on which the pulley wheel runs, said collector arm 12 being hollow and containing the conductors 13 which lead from the brushes 10 and 11 to the terminals of the motor 3.

The two pulley wheels 4 and 5 are preferably coupled together, say, by means of a connecting rod 14 (Figures 7 and 8) to ensure that they always remain "in phase" with one another, and in order that only one pair of slip rings 8, 9 and brushes 10, 11 shall be required, the pairs 6, 6 and 7, 7 of halves of the two wheels which are of the same polarity are conductively connected together. Since two connecting rods 14 cannot be employed without fouling each other or the collector arm 12, a single composite connecting rod 14 is provided which serves for connecting both pairs of halves.

Thus, referring particularly to Figure 8, at a given point on the junction line of the two halves 6 and 7, each half is formed with a lug 15 which projects into a corresponding recess formed in the other half, the lugs 15 and recesses being on different sides of the wheel, so that at the said given point the wheel will comprise, as indicated in Figures 8 and 5, two layers of different polarity. At this given point a bolt 16 is screwed from one side into engagement with the lug 15 at the other side and at the point where it passes through the other lug 15 said bolt 16 is surrounded by a conducting sleeve 17 which is insulated from said bolt by means of an insulating sleeve 18 but engages the said other lug as shown. This conducting sleeve 17 extends as shown beyond the latter lug 15 and the bolt 18 extends beyond the sleeve 17. The connecting rod 14 is made in two laminations 19 and 20 laid side by side and insulated from one another by means of insulation 21 and its end is pivotally mounted on the projecting sleeve 17 and rod 16 in such a way that one lamination 20 makes contact with the sleeve 17 and the other with the rod 16 as shown. It will thus be seen that the two laminations 19 and 20 of the connecting rod 14 are in conductive relation to the two halves 7 and 6 of the pulley, and by coupling the other end of said connecting rod in the same manner to the other pulley both the positive pair and the negative pair of halves will be connected together.

In a somewhat similar way, as shown in Figure 9, the slip rings 18, 19 and brushes 10, 11 of Figure 4 may be replaced. Thus at the centre of the pulley, a lug 22 from each half may project into a recess in the other half in the same way as the lugs and recesses above described, so that, at the centre, the pulley comprises two layers of different polarity. The axle—which is of insulating material—passes through the centre of the pulley and has mounted thereon two mutually insulated sleeves 24 which provide bearing surfaces in engagement with the said two lugs 22 respectively. The conductors 13 leading to the motor 3 extend respectively from said sleeves 24, through the interior of the axle 23 and down the collector arm 12.

The arrangements above described may be modified in a variety of ways. For example, the wires 1, 2 of the cable may take the form as shown in Figure 2 of bare strips of semicircular section twisted together with a piece of insulating tape 25 between them.

Again the flanges of the pulley wheels may be insulated and moulded to interact with the irregularities of the twisted wire to act with it as a rack and pinion and thus the wheels cannot get out of phase with the wires. Or, alternatively, the two pulley wheels may be maintained in place by a variety of other methods, such as by making a rack on the surface of a smooth wire with which said pulley wheels cooperate.

Where duo directional current is required plain undivided pulleys or brushes may be employed.

For example as shown in Figure 23 two plain undivided pulleys 50 may be mounted in insulated relation from one another, on a member 51 by which they are spaced along the cable a distance equal to an odd multiple of one half of the pitch of the wires. These pulleys are connected through their bearings to conductors 13 which are led through the collector arm 12 which is attached to the member 51, and it will be clear that duo directional current will be supplied by way of the conductors 13.

Alternatively where the cable is as in Figure 2 the plain undivided pulleys 50 may be arranged to contact with the cable at points exactly opposite to one another, either above and below, as shown in Figure 24, or on opposite sides. It will be noted that with this arrangement the collector is positively prevented from leaving the cable. Again, where contact is made on opposite points of the cable, spring brushes may be employed instead of pulley wheels as shown in Figure 25. In this arrangement two springs wiping contacts 52 depend downwardly from two opposite sides of an insulating block 53 so as to engage the cable on opposite sides, with the block above the cable as shown. In this case the conductors 13 are led from the respective contacts 52 through a collecting arm 12 which extends round and down as shown. In the case of toy railways, by using two such collectors spaced a considerable distance apart along the cable and either of which is independently capable of collecting current from the motor, it is possible to reduce considerably the difficulties of connections and cross overs, switches and the like.

In accordance with a somewhat different embodiment of the invention as shown in Figure 10 the two wires 1 and 2, which may be semi-circular in section, are laid together side by side with a strip of insulating material 26 between them, so as to form a cable of circular section, and a collector pulley is adapted to roll along said cable with its two mutually insulated flanges respectively in engagement with the two wires. Said two flanges are connected respectively to the supply conductors leading to the motor and thus the motor is supplied with current from the two wires. It is clear that in this case only one pulley wheel is required, though in some cases it may be preferred to employ two pulley wheels, one of which collects from the positive wire and the other from the negative wire, half the pulley in each case being insulated.

In practice the pulley (as shown in Figure 10) is preferably made in two mutually insulated halves 27 and 28 divided in the centre plane of the pulley, and the axle 29 of the pulley is conductively connected to one half 28 and is insulated from the other, one terminal of the collector being connected to the said axle and the other by means of a suitable brush 30 mounted in insulating relation on said axle, to the other half 27 of the pulley.

Where a cable such as that shown in Figure 10 is employed, collector arrangements such as those of Figures 24 and 25 may be clearly employed as an alternative to the pulley shown in Figure 10.

Referring now to Figures 11 to 13, these illustrate a simple arrangement of mounting a cable such as that of Figure 1. In this arrangement one of the wires, say 1, is supported at intervals when it is underneath as shown, by means of spring clips 31 which easily grip its rounded surface. By applying these clips 31 always to the same wire any insulation difficulty is overcome, and the clips need not be insulated from the wire, which may be connected to earth. In this case only the other wire 2 need be insulated at all.

Figure 14 illustrates an alternative clip 32 which, instead of being resilient consists of two parts pivoted at 33 and is provided with a grub screw 34 for securing the wire firmly in place.

Figures 15 and 16 show a support for the cable at a curve, said support consisting of a metal plate 35 having its edge 36 curved to the required curvature of the cable and having mounted at said curved edge a number of clips 31 or 32 aligned as shown so as to accommodate one of the wires, each time it is underneath, with the main run of the cable conforming to the required curvature. The hole 37 is for attaching the plate 35 to a hook or the like so that said plate 35 may be supported solely by such hook and the tension of the cable.

Also, it has been found practicable to hold down the cable, particularly that according to Figure 2, flat on a track by passing pieces of insulating material, thin vulcanite or Cellophane between the wires and fastening down at both sides on the track.

Figures 17 and 18 illustrate two lengths of a cable such as that of Figure 2 connected by means of a scarfed interlocked joint held in place by means of a clip 38 insulated from the cable by means of insulation 39. Alternatively a plain scarfed joint could be provided connected by means of an insulated bolt.

Figures 19 and 20 show two lengths of a similar cable connected by means of a butt joint held in place by means of a clip 40 insulated from the cable by means of insulation 41 and with two separate conducting strip connectors 42 for ensuring good connection between the appropriate wires.

Figure 21 shows a way of connecting two lengths of a cable such as that of Figure 1 by connecting the individual wires 1 and 2 by means of connecting collars 43 and 44. All that is necessary is to ensure that the collars 43 and 44 shall not foul the collector arm 12.

Figure 22 shows an alternative device for connecting two lengths of a cable such as that of Figure 1. In this case the division of both wires is assumed to be on the line A—A, and, as shown, the wires 1 are connected by means of a connector 45 carrying two clips 46 which grip the wires 1 on each side of said line A—A, and the wires 2 are connected by means of a similar connector 47 carrying clips 48 which similarly grip the wires 2 on each side of said line A—A.

The invention is particularly, though not exclusively, useful in connection with model railway trains and the like, either as the middle rail or overhead supply cable, or as an overhead combined supply cable and supporting cable. In the latter case the vehicle may be suspended from the collector unit itself by the arm 12 and driven by means of an air screw propeller, or by one or both of the pulleys 4 and 5. Alternatively it may be suspended from additional insulated driving wheels running on the cable. The driving of the pulleys or additional driving wheels may be effected by transmission means similar to those described in British Patent No. 512,532.

It will be seen that with this arrangement the collecting trolley of a trolley bus or the like may be made automotive.

The collector may also be employed to supply variable position lamps suspended therefrom by the arm 12.

Where high tensile strength is required as for example where long spans are employed, and the cable is used to carry the weight of the vehicle, as well as to supply the electrical power, an additional wire of high tensile strength may be incorporated in the cable.

In a cable such as that of Figures 2 and 10, such additional wire 54 may run between the two wires 1 and 2, from both of which of course it is insulated, the plain adjacent surfaces of the wires 1 and 2 being recessed to provide a conduit for said additional wire. Such additional wire may be of elongated or elliptical cross section as in Figure 26, its major axis being at right angles to the adjacent surfaces of the wires 1 and 2. This has the advantage of compensating for the natural tendency of the combined wires 1 and 2 to bend more easily in the plane of their adjacent surfaces than across said plane, since the additional wire will bend more easily in the plane of its major axis than across said plane. Thus with the additional wire it will be much easier to twist or coil the cable without kinking being produced.

As a slight modification the additional wire may be formed to fit into slightly re-entrant recesses in the wires 1 and 2 as in Figures 27 and said wires may be rolled around said additional wire, so that the latter forms a means for locking said wires 1 and 2 together.

Again, in a cable such as that of Figures 2 and 10, one of the wires 1 or 2 may be formed with a tongue which fits in a groove in the other one as shown in Figure 28. Such cable may be formed by drawing the two wires through dies and then rolling them together.

Again, where multi-phase distribution is required, more than two wires may be employed in each cable. For example negative, positive and neutral wires may be twisted together in a manner similar to Figures 1 and 2.

What I claim and desire to secure by Letters Patent is:

1. An electric cable comprising two conductors laid side by side with insulation between them, said conductors being exteriorly exposed so as to be adapted, when of different polarities, to co-operate with a collector running along the cable to supply an electric circuit in a vehicle associated with said collector, the cross section of said conductors being such as to form a longitudinal enclosed passage between them, and an additional wire of high tensile strength located in said passage.

2. An electric cable comprising two conductors laid side by side with insulation between them, said conductors being exteriorly exposed so as to be adapted, when of different polarities, to co-operate with a collector running along the cable, to supply an electric circuit in a vehicle associated with said collector, the adjacent surfaces of said conductors being formed with respective re-entrant grooves which register to form a longitudinal enclosed passage between the conductors, and an additional wire located in said passage and making a dovetailed connection with said grooves, whereby said conductors are held in assembled relation.

3. An electric cable comprising two conductors laid side by side with insulation between them, said conductors being exteriorly exposed so as to be adapted, when of different polarities, to co-operate with a collector running along the cable to supply an electric circuit in a vehicle associated with said collector, the cross section of said conductors being such as to form a longitudinal enclosed passage between them, and an additional wire of high tensile strength located in said passage, the cross section of said additional wire and passage being elongated with its major axis at right angles to the adjacent surfaces of the conductors.

4. Two lengths of electric cable comprising a plurality of conductors each coated with its own insulation, twisted about one another and provided with exposed areas on the top of the cable, so as to be adapted, when the conductors are of different polarities, to co-operate with a collector running along the top of the cable, to supply an electric circuit in a vehicle associated with said collector, said two lengths being connected together end to end with the conductors of the one connected to the conductors of the other each to each by connecting the conductors at different points of the lengths of the cable and at the sides of the cable.

5. In combination, an electric cable comprising a plurality of conductors twisted about one another and insulated from one another but exteriorly exposed, and a collector unit comprising a pulley wheel having mutually insulated portions angularly displaced from one another so as to extend through different arcs around the circumferential periphery and terminals to which said mutually insulated portions are electrically connected, said mutually insulated portions being so spaced relative to the pitch of the twisted wires that they are adapted always to engage conductors of the same polarity when said pulley wheel rolls along said cable.

6. In combination, an electric cable comprising a plurality of conductors twisted about one another and insulated from one another but exteriorly exposed, and a collector unit comprising a plurality of pulley wheels each having mutually insulated portions angularly displaced from one another so as to extend through different arcs around the circumferential periphery and terminals to which said mutually insulated portions are electrically connected, the mutually insulated portions being so spaced relative to the pitch of the twisted wires that they are adapted always to engage conductors of the same polarity when said pulley wheels roll along said cable, and the mutually insulated portions of the respective pulley wheels which engage conductors of the same polarity being connected together and being arranged to engage such conductors at different times.

7. In combination, an electric cable comprising a plurality of conductors twisted about one another and insulated from one another but exteriorly exposed, and a collector unit comprising a plurality of pulley wheels each having mutually insulated portions angularly displaced from one another so as to extend through different arcs around the circumferential periphery and terminals to which said mutually insulated portions are electrically connected, the mutually insulated portions being so spaced relative to the pitch of the twisted wires that they are adapted always to engage conductors of the same polarity when said pulley wheels roll along said cable, and the mutually insulated portions of the respective pulley wheels which engage conductors of the same polarity being connected together and being arranged to engage such conductors at different times, and means for mechanically coupling said pulley wheels together so that they remain in phase with one another.

8. In combination, a vehicle and a collector unit associated therewith, said collector unit comprising a pulley wheel circumferentially divided into mutually insulated portions angularly displaced from one another so as to extend through different arcs around the circumferential periphery, and terminals to which said mutually insulated portions are electrically connected.

9. In combination, a vehicle and a collector unit associated therewith, said collector unit comprising a plurality of pulley wheels adapted to run on a single cable, each of said pulley wheels being circumferentially divided into mutually insulated portions angularly displaced from one another so as to extend through different arcs around the circumferential periphery, and terminals to which said mutually insulated portions are electrically connected, mutually insulated portions of the respective pulley wheels being connected together each to each, and means for mechanically coupling said pulley wheels together so that they rotate in unison.

10. The combination of an electric cable having two conductors of opposite polarity, insulated one from the other and twisted about each other so as to bring portions of both conductors alternately in the same horizontal plane, the tops of the portions of both conductors being bare, a collector unit comprising a pulley having mutually insulated electro-conductive portions angularly displaced from one another so as to extend through different arcs around the circumferential periphery and terminals to which said mutually insulated portions are electrically connected, said mutually insulated portions being so spaced relative to the pitch of the twisted conductors that they are adapted always to engage portions of the conductors of the same polarity as said pulley rolls along said cable, a motor driven vehicle, a support for said collector unit carried by and movable therewith, and electrical connections between said terminals and the motor of said vehicle.

11. An electric cable comprising two conductors of opposite polarity insulated one from the other and twisted about each other so as to bring portions of both conductors alternately in the same horizontal plane, the tops of the portions of both conductors being bare, and laterally extending means forming a lock between, and following the trend of the twist of, said conductors, whereby vertical flexure of one of said conductors in relation to the other is prevented.

HUGO VICTOR FLINN.